(12) United States Patent
Teraoka et al.

(10) Patent No.: US 10,805,586 B2
(45) Date of Patent: Oct. 13, 2020

(54) PROJECTION DISPLAY UNIT WITH DETECTION FUNCTION

(71) Applicant: SONY CORPORATION, Tokyo (JP)

(72) Inventors: Yoshiyuki Teraoka, Kanagawa (JP); Mikinori Matsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 15/505,692

(22) PCT Filed: Aug. 5, 2015

(86) PCT No.: PCT/JP2015/072258
§ 371 (c)(1),
(2) Date: Feb. 22, 2017

(87) PCT Pub. No.: WO2016/035500
PCT Pub. Date: Mar. 10, 2016

(65) Prior Publication Data
US 2017/0251187 A1 Aug. 31, 2017

(30) Foreign Application Priority Data
Sep. 3, 2014 (JP) ................. 2014-178963

(51) Int. Cl.
*H04N 9/31* (2006.01)
*H04N 5/63* (2006.01)
(Continued)

(52) U.S. Cl.
CPC ........... *H04N 9/3194* (2013.01); *G03B 21/14* (2013.01); *G06F 1/3265* (2013.01);
(Continued)

(58) Field of Classification Search
None
See application file for complete search history.

(56) References Cited

U.S. PATENT DOCUMENTS

| 5,440,114 A | 8/1995 | Barbier et al. | |
| 7,364,309 B2* | 4/2008 | Sugawara | H04N 5/74 |
| | | | 348/E5.119 |

(Continued)

FOREIGN PATENT DOCUMENTS

| CN | 103019014 A | 4/2013 |
| EP | 598648 A1 | 5/1994 |

(Continued)

OTHER PUBLICATIONS

IP.com search report.*

(Continued)

*Primary Examiner* — Mohammad J Rahman
(74) *Attorney, Agent, or Firm* — Chip Law Group

(57) ABSTRACT

A projection display unit with a detection function includes a projection display section (110) and a detector (120). The projection display section (110) includes a display light source. The display light source emits light used as illumination light, and projects an image onto a projection surface with the illumination light. The detector (120) includes a detection light source that emits detection light. The detector (120) detects an object on or near the projection surface, and outputs a power-saving instruction signal to the projection display section (110) in accordance with a detection state of the object. The power-saving instruction signal instructs a transition to a power-saving mode. The projection display section (110) turns off the display light source in response to the power-saving instruction signal.

9 Claims, 13 Drawing Sheets

(51) Int. Cl.
  *H04N 5/33*     (2006.01)
  *G06F 3/042*    (2006.01)
  *G06F 3/01*     (2006.01)
  *G03B 21/14*    (2006.01)
  *G06F 1/3234*   (2019.01)
  *G06F 3/0488*   (2013.01)
  *G03B 17/54*    (2006.01)

(52) U.S. Cl.
  CPC ............ *G06F 3/0425* (2013.01); *H04N 5/33* (2013.01); *H04N 5/63* (2013.01); *H04N 9/3155* (2013.01); *G03B 17/54* (2013.01); *G06F 3/017* (2013.01); *G06F 3/0488* (2013.01); *H04N 9/3161* (2013.01); *H04N 9/3164* (2013.01); *H04N 9/3167* (2013.01); *Y02D 10/153* (2018.01); *Y02D 50/20* (2018.01)

(56) References Cited

U.S. PATENT DOCUMENTS

| | | | | |
|---|---|---|---|---|
| 7,567,366 | B2* | 7/2009 | Okamura | H04N 1/00551 310/316.01 |
| 8,666,361 | B2 | 3/2014 | Chu | G06F 3/0484 455/404.1 |
| 9,658,688 | B2* | 5/2017 | Shen | G06F 3/013 |
| 10,156,901 | B2* | 12/2018 | Zhang | G06F 3/0428 |
| 10,191,363 | B2* | 1/2019 | Hirata | G03B 21/54 |
| 2003/0222660 | A1* | 12/2003 | Morimoto | G01L 1/144 324/661 |
| 2005/0151933 | A1* | 7/2005 | Tsai | G03B 21/18 353/57 |
| 2005/0212461 | A1* | 9/2005 | Onishi | G09G 3/3406 315/291 |
| 2007/0165409 | A1* | 7/2007 | Shimaoka | H04N 9/315 362/299 |
| 2008/0055318 | A1* | 3/2008 | Glen | G09G 3/20 345/501 |
| 2009/0128540 | A1* | 5/2009 | Hsu | G09G 3/3611 345/213 |
| 2011/0103643 | A1* | 5/2011 | Salsman | G06K 9/00261 382/103 |
| 2011/0135114 | A1* | 6/2011 | Oba | G06F 1/3203 381/107 |
| 2011/0242503 | A1* | 10/2011 | Su | G03B 21/2026 353/85 |
| 2011/0297830 | A1* | 12/2011 | Willden | G08B 13/191 250/338.1 |
| 2012/0038549 | A1* | 2/2012 | Mandella | G06F 3/011 345/156 |
| 2012/0188285 | A1* | 7/2012 | Friedlander | G06F 1/3203 345/660 |
| 2012/0313910 | A1* | 12/2012 | Haraguchi | H04N 9/3179 345/207 |
| 2013/0076620 | A1 | 3/2013 | Fukano | |
| 2013/0249800 | A1* | 9/2013 | Chung | G06F 1/3259 345/166 |
| 2014/0107471 | A1* | 4/2014 | Haider | A61B 17/1703 600/424 |
| 2014/0208957 | A1* | 7/2014 | Imai | H05B 6/6435 99/342 |
| 2014/0285400 | A1* | 9/2014 | Sato | G06F 3/1446 345/1.3 |
| 2014/0300564 | A1* | 10/2014 | Yoshino | G06F 3/0416 345/173 |
| 2015/0355471 | A1* | 12/2015 | Yoneno | G02B 27/2214 348/51 |
| 2016/0022374 | A1* | 1/2016 | Haider | A61B 17/17 606/96 |
| 2016/0086574 | A1* | 3/2016 | Buckley | G09G 5/10 345/690 |
| 2016/0234365 | A1* | 8/2016 | Alameh | H04W 52/0254 |
| 2016/0313842 | A1* | 10/2016 | Pacheco | G06F 3/0416 |
| 2019/0356766 | A1* | 11/2019 | Kochan, Jr. | H04M 1/7253 |

FOREIGN PATENT DOCUMENTS

| | | |
|---|---|---|
| JP | 06-236236 A | 8/1994 |
| JP | 2010-197440 A | 9/2010 |
| JP | 2011-197645 A | 10/2011 |
| JP | 2012-093767 A | 5/2012 |
| JP | 2013-068813 A | 4/2013 |
| JP | 2013-115649 A | 6/2013 |
| JP | 2013-182061 A | 9/2013 |
| WO | 2011/105228 A1 | 9/2011 |

OTHER PUBLICATIONS

International Search Report and Written Opinion of PCT Application No. PCT/JP2015/072258, dated Sep. 1, 2015, 10 pages of English Translation and 10 pages of ISRWO.

International Preliminary Report on Patentability of PCT Application No. PCT/JP2015/072258, dated Mar. 16, 2017, 10 pages of English Translation and 6 pages of IPRP.

* cited by examiner

PROJECTION DISPLAY UNIT WITH DETECTION FUNCTION

CROSS REFERENCE TO RELATED APPLICATIONS

This application is a U.S. National Phase of International Patent Application No PCT/JP2015/072258 filed on Aug. 5, 2015, which claims priority benefit of Japanese Patent Application No. JP 2014-178963 filed in the Japan Patent Office on Sep. 3, 2014. Each of the above-referenced applications is hereby incorporated herein by reference in its entirety.

TECHNICAL FIELD

The disclosure relates to a projection display unit with a detection function that detects an object on or near a projection surface.

BACKGROUND ART

In recent years, smartphones, tablet terminals, and other similar electronics with a touch panel have enabled the page ejection and scaling of an image displayed on the screen with a pointing operation conforming to human intuition. On the other hand, display units that project an image onto a screen to display the image have long been known as projectors.

CITATION LIST

Patent Literature

[PTL 1] Japanese Unexamined Patent Application Publication No. 2013-206058

SUMMARY OF INVENTION

PTL 1 proposes a power-saving display unit with a touch panel. This display unit is provided with a proximity sensor disposed near the touch panel and stops power supply to the touch panel in accordance with a detection result of the proximity sensor.

In recent years, projectors have also been requested to support a pointing operation, similarly to tablet terminals and other electronics. This pointing operation allows a user to handle a projected image with fingers in conformity with intuition so that the user feels as if he or she operated a touch panel. Particularly, handheld compact projectors, which have lately appeared on the market, are desired to support a pointing operation that allows a user to handle an image projected onto a region of about 20 to 30 inches diagonally. For that purpose, any mechanism dedicated to detecting manual operations is necessary, because no touch panel is provided on a screen, wall, or other surface onto which an image is projected. In addition to this method, for example, some projectors allow an image to be moved through an operation of a radio control unit, such as a remote control. Because of this compact body, however, operating a projector with the radio control unit may be far from being smart.

Turning off the light source when a projector is not in use is effective in reducing power consumption. To turn off the light source, it is possible to provide an ON/OFF switch in the main body. However, when the projector is disposed in an inaccessible place, such as a wall and a ceiling, the switch may be hard to be operated easily. It is also possible to use a remote control or other radio control, but operating the remote control may be unavoidably troublesome.

The main body of a projector is positioned apart from its projection surface. Therefore, a technique, as described in PTL 1, in which a proximity sensor is disposed in the main body makes it difficult to determine whether the projector is in use and to determine whether to turn off the light source for the sake of power saving.

It is desirable to provide a projection display unit with a detection function which achieves power saving.

A projection display unit with a detection function according an embodiment of the disclosure includes a projection display section and a detector. The projection display section includes a display light source that emits light used as illumination light and projects an image onto a projection surface with the illumination light. The detector includes a detection light source that emits detection light and detects an object on or near the projection surface. Furthermore, the detector outputs a power-saving instruction signal, which instructs a transition to a power-saving mode, to the projection display section in accordance with a detection state of the object. In response to the power-saving instruction signal, the projection display section turns off the display light source.

In the projection display unit with a detection function according to an embodiment of the disclosure, the detector outputs the power-saving instruction signal, which instructs a transition to the power-saving mode, to the projection display section in accordance with a detection state of the object. In response to the power-saving instruction signal, the projection display section turns off the display light source.

According to the embodiment of the disclosure, the projection display unit with a detection function causes the projection display section to turn off the display light source in response to the power-saving instruction signal that the detector outputs in accordance with the detection state of the object. This makes it possible to achieve power saving.

It is to be noted that an effect of the disclosure is not limited thereto, and may be any of the effects described in the disclosure.

DESCRIPTION OF EMBODIMENTS

Some embodiments of the disclosure are described below in detail with reference to the accompanying drawings. The description is given in the following order.
1. First embodiment (projection display unit equipped with touch detection function)
   1.1 Overall configuration and operation of optical system in projection display unit (FIG. 1 to FIG. 6)
      1. 1. 1 Overall exemplary configuration of optical system in projection display unit
      1. 1. 2 Basic operation of projection display unit
      1. 1. 3 Functions of polarizer
      1. 1. 4 Modification of optical system (FIG. 6)
      1. 1. 5 Other modifications of optical system
   1. 2 Configuration and operation of control system (FIG. 7 to FIG. 9)
      1. 2. 1 Exemplary configuration of control system
      1. 2. 2 Operation under power-saving control
   1. 3 Effects
2. Second embodiment (projection display unit equipped with power-saving function according to gesture motions) (FIG. 10)
   2. 1 Configuration and operation of control system
3. Third embodiment (projection display unit equipped with power-saving function of controlling frame rate of detector) (FIG. 11 to FIG. 12)
   3. 1 Configuration and operation of control system
4. Fourth embodiment (projection display unit equipped with power-saving function using camera) (FIG. 13).
   4. 1 Configuration and operation of control system
5. Other embodiments 1. First Embodiment (1. 1 Overall Configuration and Operation of Optical System in Projection Display Unit)
(1. 1. 1 Exemplary Overall Configuration of Optical System in Projection Display Unit)

Figure 1:
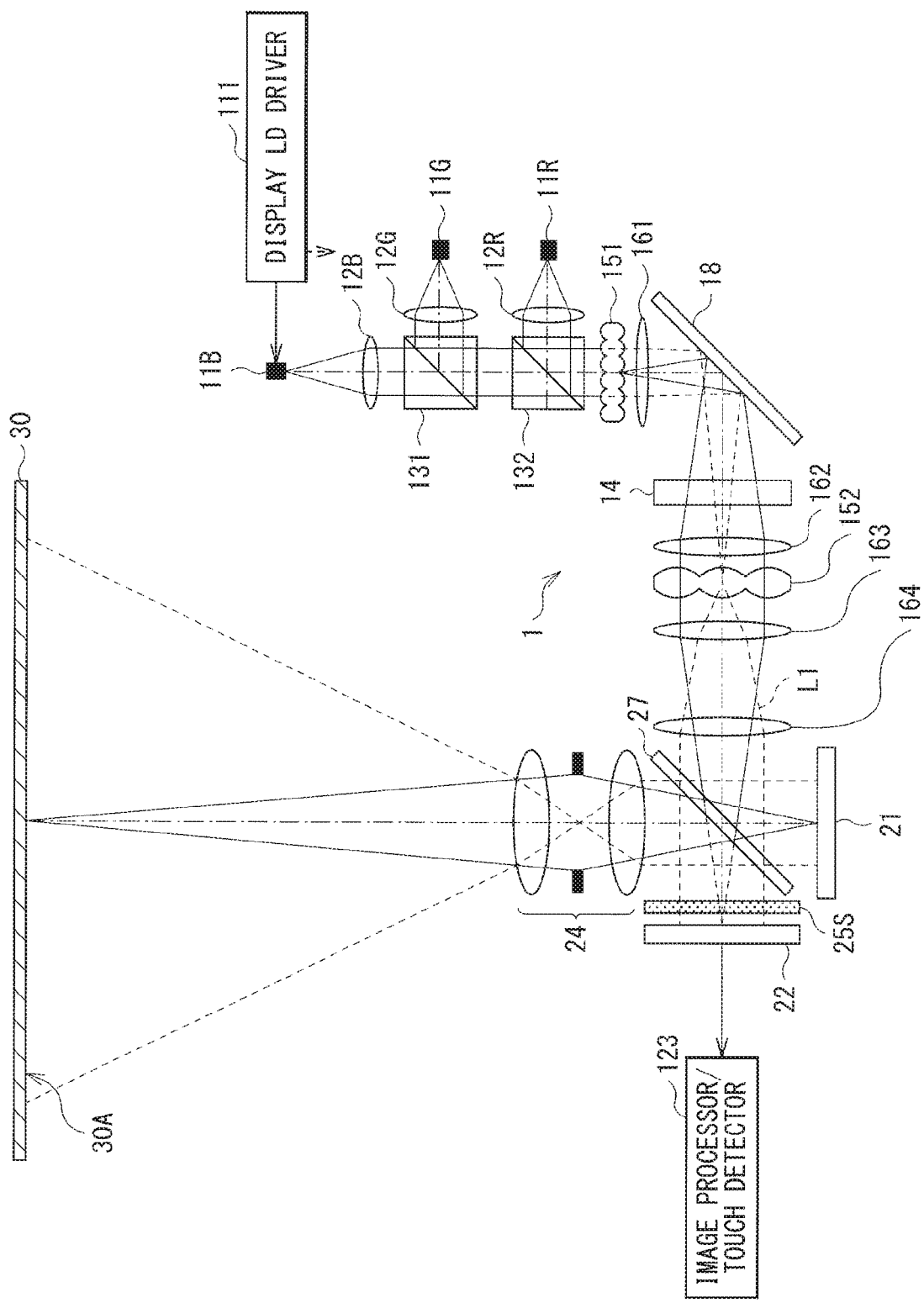
FIG. 1 is a configuration diagram illustrating an exemplary overall configuration of an optical system in a projection display unit according to a first embodiment of the disclosure.
Figure 2:
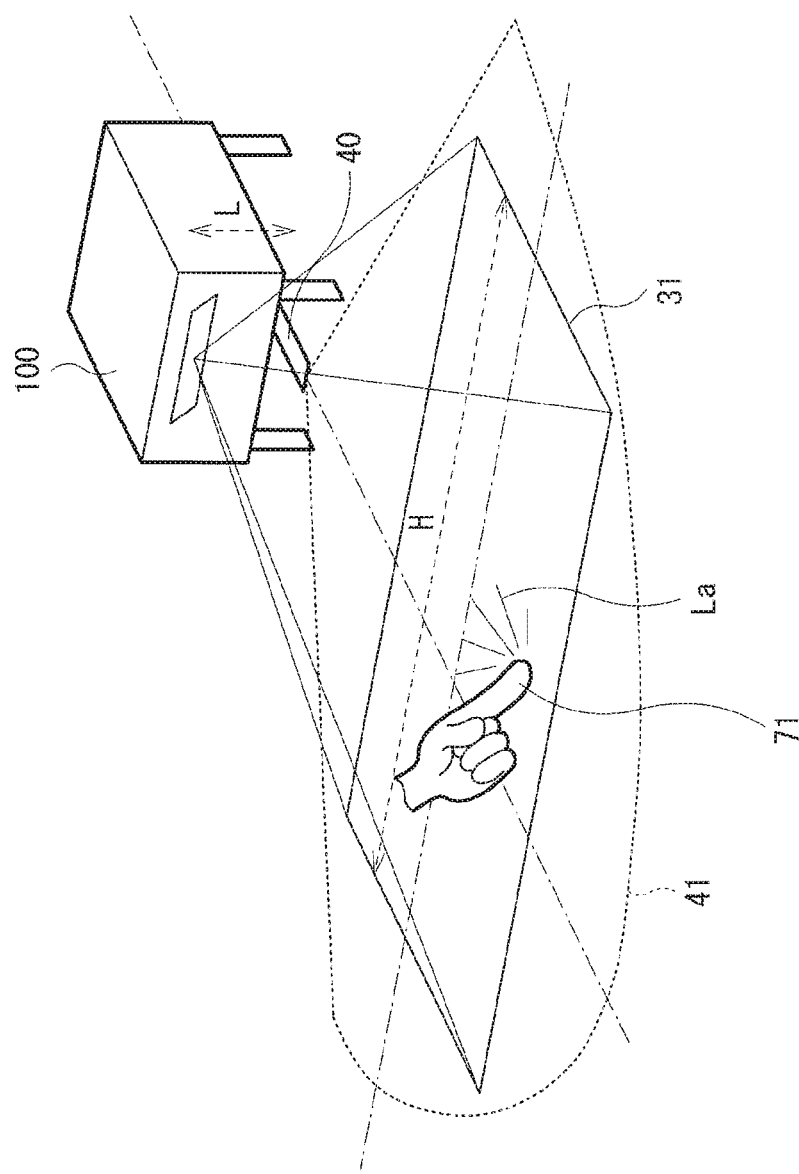
FIG. 2 is an outline view of an exemplary state of the projection display unit when the projection display unit displays an image and detects an object.
Figure 3:
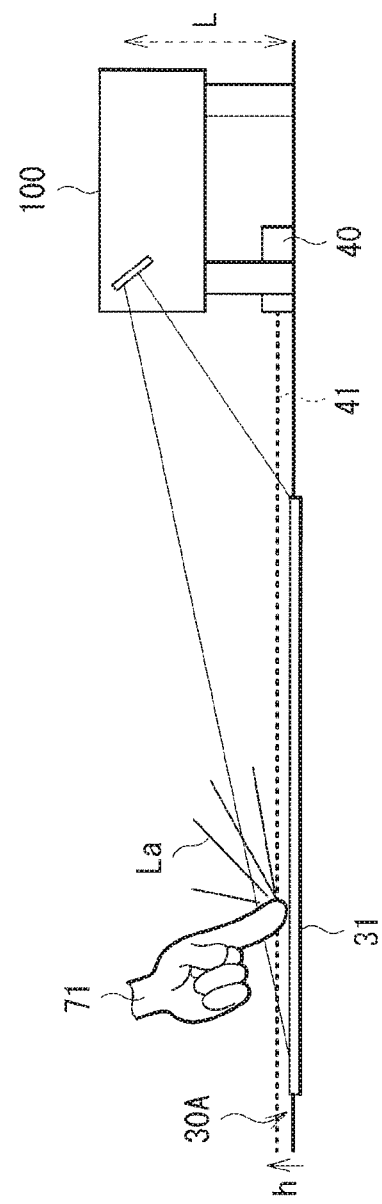
FIG. 3 is a configuration diagram illustrating an exemplary state of the projection display unit illustrated in FIG. 2 as viewed in a lateral direction.
Figure 4:
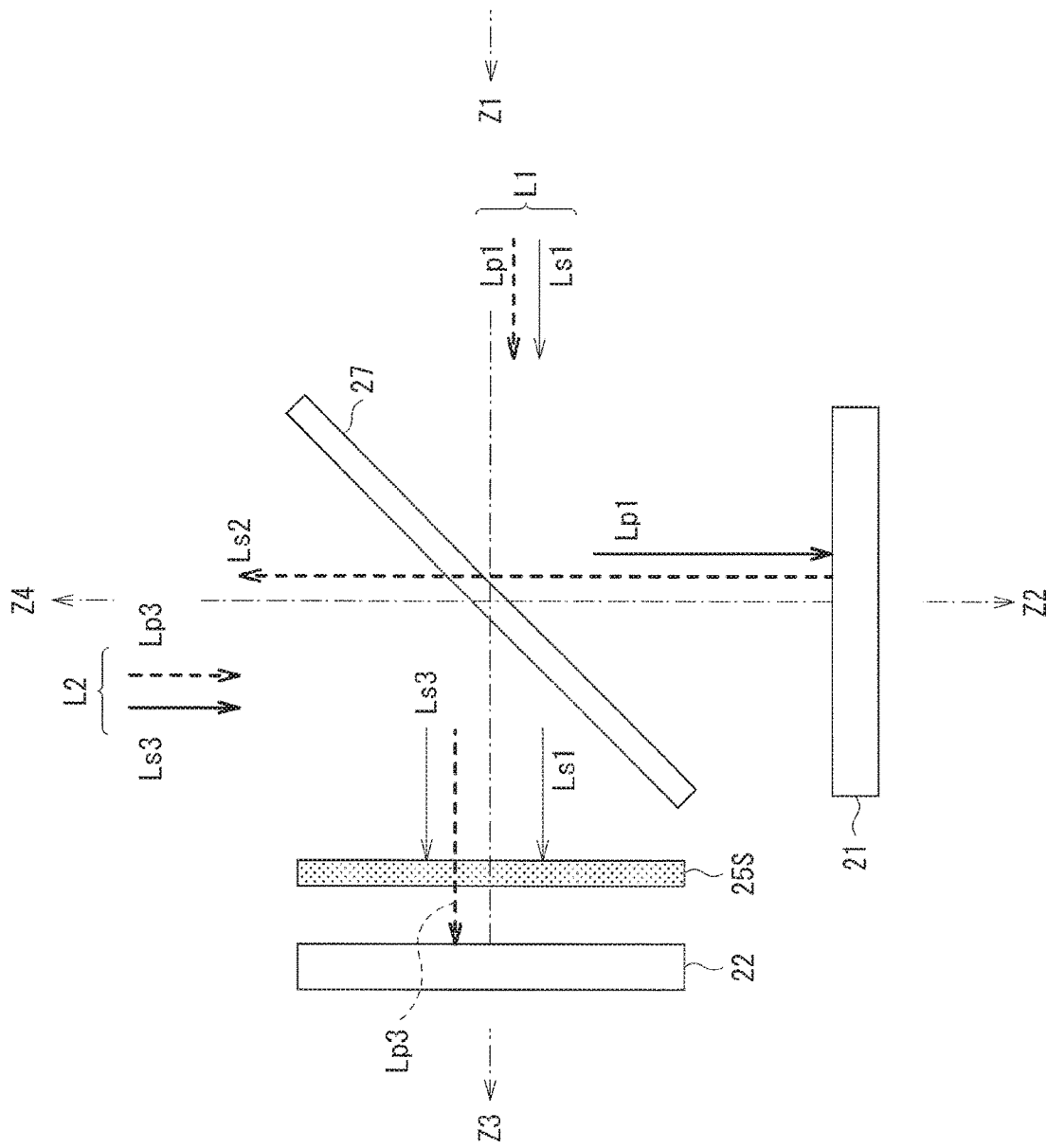
FIG. 4 is a cross-sectional view of an exemplary main section of the projection display unit when light enters a light bulb and an imaging element.
Figure 5:
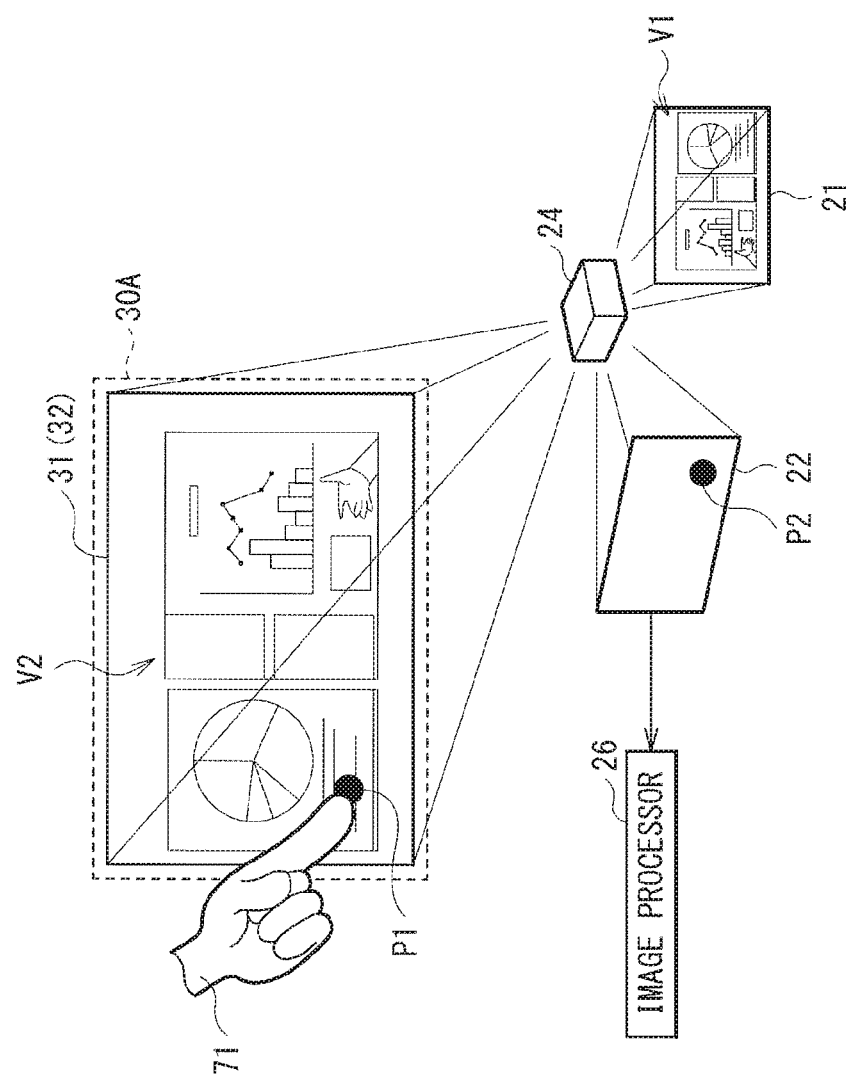
FIG. 5 is an explanatory schematic view of a concept of displaying an image and detecting an object.

FIG. 1 illustrates an exemplary overall configuration of an optical system in a projection display unit, usually called a projector, according to a first embodiment of the disclosure. This projection display unit displays an image and has a function of actively detecting an object with near infrared light, (touch detection function). FIG. 2 illustrates an exemplary state of the projection display unit when the projection display unit displays an image and detects an object. FIG. 3 illustrates an exemplary configuration of the projection display unit illustrated in FIG. 2 as viewed in a lateral direction. FIG. 4 illustrates exemplary light entering a light bulb 21 and an imaging device 22 in the projection display unit illustrated in FIG. 1. FIG. 5 schematically illustrates a concept that the projection display unit displays an image and detects an object.

As illustrated in FIG. 1, the projection display unit includes an illuminating section 1, the light bulb 21, the imaging device 22, a wire grid 27 that acts as a polarization split device, a projection lens 24, a polarizer 25S that acts as a polarization member, an image processor/touch detector 123, and a detection laser diode (LD) driver 122.

As illustrated in FIG. 4, the illuminating section 1 emits illumination light L1 from a first direction Z1 toward the wire grid 27. The illuminating section 1 includes a display light source and a plurality of illuminating optical members. The plurality of illuminating optical members generate the illumination light L1 on the basis of light from light from the light source, and lead the illumination light L1 to the light bulb 21. The display light source may include a plurality of light sources disposed on different optical paths. The illuminating section 1 may further include an optical path composite element that combines the optical paths of two or more of the plurality of light sources.

More specifically, the illuminating section 1 includes a blue laser 11B, a green laser 11G, and a red laser 11R, as the plurality of light sources disposed on different optical paths. Furthermore, the illuminating section 1 includes, as the plurality of illuminating optical members, a first coupling lens 12B, a second coupling lens 12G, a third coupling lens 12R, a driven optical device 14, a mirror 18, a first dichroic prism 131, a second dichroic prism 132, a first fly-eye lens 151, a second fly-eye lens 152, a first condenser lens 161, a second condenser lens 162, a third condenser lens 163, and a fourth condenser lens 164.

The blue laser 11B is a laser light source that emits blue light with a wavelength of about 450 nm, for example. The green laser 11G is a laser light source that emits green light with a wavelength of about 520 nm, for example. The red laser 11R is a laser light source that emits red light with a wavelength of about 640 nm, for example.

A detection LD driver 122 controls light emissions of a first light source (e.g., blue laser 11B), a second light source (e.g., green laser 11G), and a third light source (e.g., red laser 11R). For example, the detection LD driver 122 controls each of the light emissions of the first to third light sources in conformity with a field sequential scheme.

The second coupling lens 12G is a coupling lens that collimates green light emitted from the green laser 11G to generate parallel light and then couples this parallel light to the first dichroic prism 131. Likewise, the first coupling lens 12B is a coupling lens that collimates blue light emitted from the blue laser 11B and then couples the parallel blue light to the first dichroic prism 131. The third coupling lens 12R is a coupling lens that collimates red light emitted from the red laser 11R and then couples the parallel red light to the second dichroic prism 132. In short, each of the coupling lenses 12R, 12G, and 12B may preferably collimate an incident laser light to generate parallel light.

Each of the first dichroic prism 131 and the second dichroic prism 132 is an optical path composite element that combines the optical paths of two or more light sources. The first dichroic prism 131 is a prism that selectively transmits the incident blue light through the first coupling lens 12B but selectively reflects the incident green light through the second coupling lens 12G. The second dichroic prism 132 is a prism that selectively transmits the incident blue light and green light from the first dichroic prism 131 but selectively reflects the incident red light through the third coupling lens 12R. In this way, both the first dichroic prism 131 and the second dichroic prism 132 subject the red light, the green light, and the blue light to color synthesis, namely, combines the optical paths.

The driven optical device 14 is an optical device that reduces speckle noises and interference fringes of the illumination light L1. This driven optical device 14 is disposed in the optical path between the first condenser lens 161 and the second condenser lens 162. The driven optical device 14 changes a state of the flux of the passing illumination light L1 by slightly vibrating, for example in directions parallel and vertical to the optical axis. In this way, it is possible for the driven optical device 14 to reduce speckle noises and interference fringes of the illumination light L1.

Each of the first fly-eye lens 151 and the second fly-eye lens 152 is an optical member, called an integrator, which is made up of a plurality of lenses arrayed on a substrate in a two dimensional fashion. Each of the first fly-eye lens 151 and the second fly-eye lens 152 spatially splits the flux of the incident light in accordance with the array of the lenses and then emits the light fluxes. The first fly-eye lens 151 is disposed in the optical path between the second dichroic prism 132 and the first condenser lens 161. The second fly-eye lens 152 is disposed in the optical path between the second condenser lens 162 and the third condenser lens 163. Each of the first fly-eye lens 151 and the second fly-eye lens 152 creates a uniform in-plane luminous distribution of the illumination light L1.

The mirror 18 is a device that bends the optical path of the illumination light L1. The mirror 18 is disposed in the optical path between the first condenser lens 161 and the driven optical device 14. The first condenser lens 161 is a lens that collects light emitted from the first fly-eye lens 151 and then allows the collected light to enter the driven optical device 14 through the mirror 18. The second condenser lens 162 is a lens that collects light emitted from the driven optical device 14 and then allows the collected light to enter the second fly-eye lens 152.

Both the third condenser lens 163 and the fourth condenser lens 164 are lenses that collect light emitted from the second fly-eye lens 152 and then emit the collected light toward the wire grid 27 as the illumination light L1.

The wire grid 27 may be formed by, for example, arranging metal bars over a glass substrate in a reticular pattern with minute spacings therebetween. As illustrated in FIG. 4, the wire grid 27 receives the illumination light L1 from the first direction Z1. The light bulb 21 is disposed in a second direction Z2. Both the polarizer 25S and the imaging device 22 are disposed in a third direction Z3. The projection lens 24 is disposed in a fourth direction Z4.

The wire grid 27 is a polarization split device that separates the incident light into a first polarization component and a second polarization component and then emits the first and second polarization components in different directions. In this case, for example, the first polarization component may be a P polarization component, and a second polarization component may be an S polarization component. The wire grid 27 selectively reflects a specific first polarization component and selectively transmits a specific second polarization component. As illustrated in FIG. 4, for example, the wire grid 27 emits (more specifically reflects), in the second direction Z2, most portion of the P polarization component Lp1 contained in the illumination light L1 having entered the wire grid 27 from the first direction Z1. In addition, the wire grid 27 emits (more specifically transmits) most portion of the S polarization component Ls1 contained in the illumination light L1 in the third direction Z3. Moreover, as illustrated in FIG. 4, the wire grid 27 emits (more specifically, reflects), in the third direction Z3, most portion of the P polarization component Lp3 contained in the detection light L2 having entered the wire grid 27 from the direction opposite to the fourth direction Z4.

The light bulb 21 is a reflective liquid crystal device that may be made of Liquid Crystal On Silicon (LCOS), for example. As illustrated in FIG. 4, for example, when the illumination light L1 that has passed through the wire grid 27 is incident on the light bulb 21 from the second direction Z2, the light bulb 21 modulates the first polarization component (e.g., the P polarization component Lp1) contained in the illumination light L1 on the basis of image data. Thereafter, the light bulb 21 emits the modulated light toward the wire grid 27 in the fourth direction Z4. As illustrated in FIG. 4, the light bulb 21 rotates a polarization of the incident light to generate an S polarization component Ls2, for example, and then emits the S polarization component Ls2 as the modulated light. The light bulb 21 makes it possible to display a black image by returning the incident P polarization component Lp1 to the wire grid 27 with its polarization maintained as it is.

When the incident modulated light from the light bulb 21 and has passed through the wire grid 27 enters the projection lens 24 from the fourth direction Z4, the projection lens 24 projects the modulated light onto a projection surface 30A of a screen 30. Furthermore, as illustrated in FIG. 4, the projection lens 24 receives the detection light L2 from the direction opposite to the travel direction of the modulated light. The projection lens 24 serves as a projection optical system used to project an image as well as an imaging optical system used to detect an object.

The imaging device 22 may be made of a solid imaging device, such as a complementary metal-oxide semiconductor (CMOS) or a charge coupled device (CCD). The imaging device 22 is disposed at a mutually optically conjugate location to the light bulb 21. More specifically, when the light bulb 21 is a reflective liquid crystal device, the display surface, or the liquid crystal surface, of the light bulb 21 on which an image is to be created is disposed at a mutually optically conjugate location to the imaging surface of the imaging device 22. As illustrated in FIG. 4, the imaging device 22 receives, from the third direction Z3, the detection light L2 that has passed through the projection lens 24 and the wire grid 27.

The polarizer 25S is a polarization member that is one of optical members that reduce the second polarization component contained in the illumination light L1. The polarizer 25S is disposed between the imaging device 22 and the wire grid 27. The polarizer 25S removes the second polarization component (e.g., S polarization component) contained in the incident light. As illustrated in FIG. 4, when the illumination light L1 enters the polarizer 25S through the wire grid 27, the polarizer 25S removes at least the S polarization component Ls1 contained in the illumination light L1, as the second polarization component.

As illustrated in FIG. 2, FIG. 3, and FIG. 5, the image processor/touch detector 123 detects a location P1 of the feature point of an indicating matter (object) 71, such as a human finger or a pointer, on the basis of a detection signal supplied from the imaging device 22, or a result of the imaging of the imaging device 22. The detected location is related to coordinates in a projected image V2 projected onto the projection surface 30A. In the examples of FIG. 2, FIG. 3, and FIG. 5, the feature point is the tip of a human finger; however, the feature point is not limited thereto. Alternatively, the feature point may be the center of gravity of a human finger or palm. In short, the feature point may be selected as appropriate.

FIG. 2 and FIG. 3 each illustrate the configuration of the projection display unit when the projection display unit employs a short focus type. As illustrated in FIG. 2 and FIG. 3, the projection display unit has a near infrared light projection section 40 under a main body 100. The projection surface 30A may be a flat floor surface, for example. The near infrared light projection section 40 is a detection light source section that emits near infrared detection light 41, as invisible detection light, from a spot positioned at a predetermined height h above the projection surface 30A. As described later with reference to FIG. 7, the near infrared light projection section 40 may include an infrared laser 121 as a detection light source. The near infrared light projection section 40 emits the near infrared detection light 41 from the spot positioned at the predetermined height h above the projection surface 30A so as to cover a region corresponding to at least a projected region 31 of an image. The imaging device 22 receives scattered near infrared light La, as the detection light L2, which has passed through the projection lens 24 and the wire grid 27 and scattered by the indicating matter 71. The near infrared light projection section 40 irradiates the projection surface 30A with the near infrared detection light 41, which is the detection invisible light. The near infrared detection light 41 may have a width in a direction along the height h. In this case, the near infrared detection light 41 does not necessarily have to be completely away from the projection surface 30A by the predetermined height h. As an alternative example, a portion of the near infrared detection light 41 in a width direction, or in a direction along the height h, may make contact with the projection surface 30A. In other words, the portion of the light may overlap the projection surface 30A at a height h of zero.

The projection lens 24 in the above projection display unit may be an ultra-short focus lens having a throw ratio of 0.38 or less. As illustrated in FIG. 2 and FIG. 3, the throw ratio is expressed by L/H, where L denotes a distance from the projection lens 24 to the projection surface 30A, and H denotes a width of the projected region.

The projection surface 30A does not have to be a special screen. The projection surface 30A is not limited to a floor surface as illustrated in FIG. 2 and FIG. 3. Alternatively, the projection surface 30A may be a wall surface.

(1. 1. 2 Basic Operation of Projection Display Unit)

In the above projection display unit, as illustrated in FIG. 1 and FIG. 5, the light bulb 21 generates image information V1, and then the projection lens 24 enlarges and projects the image information V1 onto the projection surface 30A of the screen 30, thereby displaying a projected image V2. Furthermore, the projection display unit uses the imaging device 22 to detect a location of an object on the projection surface 30A, more specifically a location P1 of the feature point of the indicating matter (object) 71, such as a human finger or a pointer. The imaging device 22 images a photographed region 32 that is substantially identical to the projected region 31 on the projection surface 30A.

The projection display unit uses laser light sources in the illuminating section 1 to align polarization components contained in the illumination light L1 so as to be dominant. More specifically, the first polarization component may account for 99.0% or higher, more preferably 99.5% or higher. In this case, the dominant first polarization component may be chosen from any of the S polarization component Ls1 and the P polarization component Lp1, depending on a property of a polarization conversion element.

Supposing that the first polarization component is the P polarization component and that the second polarization component is the S polarization component, the wire grid 27 reflects most portion of the P polarization component, and transmits most portion of the S polarization component. As a result, for example, the P polarization component Lp1 may account for 99.5% of the illumination light L1 to become a dominant component, and the S polarization component Ls1 may account for remaining 0.5% of the illumination light L1. As illustrated in FIG. 4, for example, the wire grid 27 reflects most portion of the dominant P polarization component Lp1 and then emits the reflected P polarization component Lp1 to the light bulb 21. When the P polarization component Lp1 enters the light bulb 21, the P polarization component Lp1 is modulated (more specifically rotated) by the light bulb 21 so that the P polarization component Lp1 is changed into modulated light of the S polarization component Ls2. Thereafter, the modulated light passes through the wire grid 27 and then enters the projection lens 24. As illustrated in FIG. 5, the modulated light of the S polarization component Ls2 is projected as the projected image V2 onto the projection surface 30A of the screen 30 by the projection lens 24.

In the projection display unit, the imaging device 22 is disposed at a mutually optically conjugate location to the light bulb 21. In addition, the projection lens 24 functions as an optical projection system used to project an image and as an optical image formation system used to detect an object. Therefore, as illustrated in FIG. 5, the projection lens 24 enables the imaging device 22 to image the photographed region 32 that is substantially identical to the projected region 31. By disposing the light bulb 21 and the imaging device 22 at mutually conjugate locations, it is possible to monitor a location P1 of the feature point of the indicating matter 71, such as a human finger or a pointer, above the projection surface 30A while the feature point is overlaid on the projected image V2 by the projection lens 24. For example, the image processor/touch detector 123 subjects shapes of the indicating matter 71 to image processing and detects coordinates of the location P1 of the feature point of the indicating matter 71, thereby enabling a pointing operation on the projected image V2. In this case, coordinates of any location in the projected region 31 correspond one-to-one to coordinates of a location in the photographed region 32. Therefore, coordinates of a detected location P2 on the imaging device 22 side correspond to coordinates of the location P1 of the feature point of the indicating matter 71. It is to be noted that, two or more indicating matters 71 may be used so that it is possible to detect coordinates of tips of fingers of both hands, for example. By using locations of the feature point of the indicating matter 71 detected in this manner, it is possible to perform intuitive operations in the projected image V2 as if a touch panel were incorporated into the projected image V2 created by the projector.

As illustrated in FIG. 2 and FIG. 3, the projection display unit creates a membranous near infrared barrier at the predetermined height h ranging from several millimeters to several tens of millimeters above the projection surface 30A. This membranous near infrared barrier has a size of about 2 mm to 3 mm in a height direction and is wide enough to cover the projected region 31 in a region direction. Since the projection surface 30A has typically a flat shape, the membrane of the emitted near infrared light travels in a straight line without being blocked unless any indicating matter 71, such as an obstacle, finger, or pointer, is present at a midway point. Thus, the near infrared light barrier is not imaged by the imaging device 22 that monitors the projection surface 30A. When an object such as a finger moves to a location that is several millimeters close to the projection surface 30A covered with the near infrared light barrier, or when a user performs an operation of touching the projection surface 30A, the barrier light is blocked by the finger and thus scattered at this point. The light that has hit and been scattered by the finger travels in all directions. In this case, some of the light returns to the aperture of the projection lens 24. The return light passes through the projection lens 24, then is reflected by the wire grid 27, and reaches the imaging device 22. Since the light bulb 21 and the imaging device 22 that create an image are disposed at mutually conjugate locations, scattered luminous points generated in a dot shape above the projection surface 30A are imaged by the imaging device 22 so that the scattered luminous points appear in the projected image at locations corresponding one-to-one to those on the projection surface 30A. In this way, it is possible to detect locations of the scattered luminous points. The projection display unit that has an ultra-short focus lens has a merit of enabling a user to view the screen easily during operations, because the projected light travels near the projection surface 30A and thus is less likely to be blocked by a portion of the user's body.

(1. 1. 3 Effect of Polarizer)

Next, an effect of the polarizer 25S is described with reference to FIG. 4. The detection light L2 to be incident on the wire grid 27 contains an S polarization component Ls3 and a P polarization component Lp3 as polarization components. The wire grid 27 reflects most portion of the P polarization component Lp3 in the third direction Z3. When the polarizer 25S removes the S polarization component, almost all of the reflected P polarization component Lp3 reaches the imaging device 22. In addition, the wire grid 27 also emits the S polarization component Ls1 contained in the incident illumination light L1 in the third direction Z3. The S polarization component Ls1 turns out to be a noise component of the detection light L2. When entering the imaging device 22, the S polarization component Ls1 decreases an S/N ratio for detection, thereby degrading a detection precision. Thus, by disposing the polarizer 25S to remove the S polarization component Ls1, it is possible to increase the S/N ratio, thereby improving the detection precision.

As described above, the P polarization component Lp1 contained in the illumination light L1 is reflected by the wire grid 27 in a direction different from the direction toward the imaging device 22, whereas the S polarization component Ls1 contained in the illumination light L1 is removed by the polarizer 25S. This makes it possible to ideally allow only the detection light L2 to enter the imaging device 22.

(1. 1. 4 Modification of Optical System)

Figure 6:
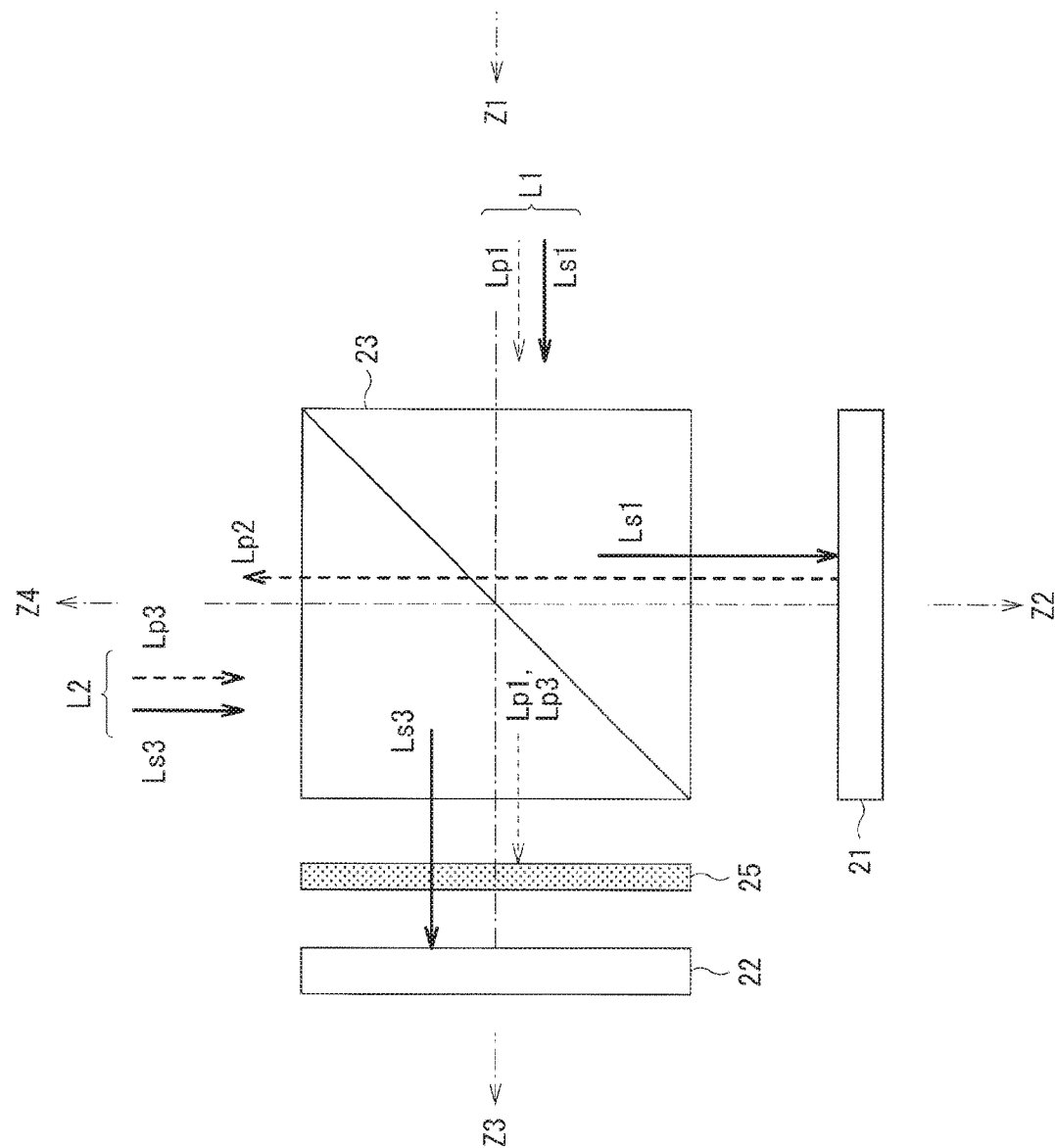
FIG. 6 is a cross-sectional view of a main section of a modification that adopts a polarization beam splitter as a polarization split device.

In the above exemplary configuration illustrated in FIG. 1 and FIG. 4, the wire grid 27 is used as a polarization split device. Instead of the wire grid 27, however, a polarization beam splitter 23 may be used as illustrated in FIG. 6. Furthermore, instead of the polarizer 25S that removes the S polarization component, a polarizer 25 that removes the P polarization component is provided in this modification.

The polarization beam splitter 23 may have a configuration in which prisms each of which is coated with a multi-layer film are bonded together. Alternatively, the polarization beam splitter 23 may be a beam splitter similar to a prism, in which a device having a polarization property is interposed.

Supposing that the first polarization component is the P polarization component and that the second polarization component is the S polarization component, the wire grid 27 configured as illustrated in FIG. 4 reflects the P polarization component, and transmits the S polarization component. In contrast, the polarization beam splitter 23 has the opposite property.

The polarization beam splitter 23 has four optical surfaces. In the description that is given with reference to FIG. 6, the two surfaces that face each other in a horizontal direction are referred to as a first optical surface and a third optical surface; the two surfaces that face each other in a vertical direction are referred to as a second optical surface and a fourth optical surface. As illustrated in FIG. 6, the illumination light L1 enters polarization beam splitter 23 from the first direction Z1 via the first optical surface. The light bulb 21 is disposed in the second direction Z2 with respect to the second optical surface of the polarization beam splitter 23. Both the polarizer 25 and the imaging device 22 are disposed in the third direction Z3 with respect to the third optical surface of the polarization beam splitter 23. The projection lens 24 is disposed in the fourth direction Z4 with respect to the fourth optical surface of the polarization beam splitter 23.

The polarization beam splitter 23 is a polarization split device that splits incident light into the first polarization component (e.g., S polarization component) and the second polarization component (e.g., P polarization component) and then emits the first and second polarization components in different directions. The polarization beam splitter 23 selectively reflects a specific first polarization component, and selectively transmits a specific second polarization component. As illustrated in FIG. 6, for example, the polarization beam splitter 23 emits (more specifically reflects), in the second direction Z2, almost all of the S polarization component Ls1 contained in the illumination light L1 having entered the polarization beam splitter 23 from the first direction Z1. In addition, the polarization beam splitter 23 emits (more specifically transmits) almost all of the P polarization component Lp1 contained in the illumination light L1 in the third direction Z3. Moreover, as illustrated in FIG. 6, the polarization beam splitter 23 emits (more specifically reflects), in the third direction Z3, almost all of the S polarization component Ls3 contained in the detection light L2 having entered the polarization beam splitter 23 from the direction opposite to the fourth direction Z4.

Supposing that the first polarization component is the S polarization component and that the second polarization component is the P polarization component, the polarization beam splitter 23 reflects most portion of the S polarization component, and transmits most portion of the P polarization component. As a result, for example, the S polarization component Ls1 may account for 99.5% of the illumination light L1 to become a dominant component, and the P polarization component Lp1 may account for the remaining 0.5% of the illumination light L1. As illustrated in FIG. 6, the polarization beam splitter 23 reflects almost all of the dominant S polarization component Ls1 and then emits the S polarization component Ls1 to the light bulb 21. When the S polarization component Ls1 is incident on the light bulb 21, the S polarization component Ls1 is modulated (more specifically rotated) by the light bulb 21 so that the S polarization component Ls1 is changed into modulated light of the P polarization component Lp2. Thereafter, the modulated light passes through the polarization beam splitter 23 and then enters the projection lens 24. As illustrated in FIG. 5, the modulated light of the P polarization component Lp2 is projected as the projected image V2 onto the projection surface 30A of the screen 30 by the projection lens 24.

The detection light L2 that has entered the polarization beam splitter 23 contains the S polarization component Ls3 and the P polarization component Lp3 as polarization components. The polarization beam splitter 23 reflects almost all of the S polarization component Ls3 in the third direction Z3. When the polarizer 25 removes the P polarization component, almost all of the S polarization component Ls3 reaches the imaging device 22. In addition, the polarization beam splitter 23 also emits the P polarization component Lp1 contained in the incident illumination light L1 in the third direction Z3. The P polarization component Lp1 turns out to be a noise component of the detection light L2. When the P polarization component Lp1 enters the imaging device 22, the P polarization component Lp1 decreases an S/N ratio for detection, thereby degrading a detection precision. Thus, by disposing the polarizer 25 to remove the P polarization component Lp1, it is possible to increase the S/N ratio, thereby improving the detection precision.

As described above, the S polarization component Ls1 contained in the illumination light L1 is reflected by the polarization beam splitter 23 in a direction different from the direction toward the imaging device 22, whereas the P polarization component Lp1 is removed by the polarizer 25. This makes it possible to ideally allow only the detection light L2 to enter the imaging device 22. There are cases where unwanted noise components contained in the illumination light L1 enter the imaging device 22, depending on an incident angle of light on the polarization beam splitter 23 or optical characteristics of the polarization beam splitter 23 and the polarizer 25. For this reason, as illustrated in FIG. 6, the illuminating section 1 may preferably have an internal configuration that reduces noise components in the detection light.

(1. 1. 5 Other Modifications of Optical System)

One of the first fly-eye lens 151 and the second fly-eye lens 152 may be removed from the illuminating section 1 in the configuration of FIG. 1. When only the second fly-eye lens 152 is used, neither the first condenser lens 161 nor the second condenser lens 162 is necessary. When only the first fly-eye lens 151 is used, neither the third condenser lens 163 nor the fourth condenser lens 164 is necessary.

When a sufficiently good polarization property is ensured, the polarizer 25S may be removed in the configuration of FIG. 1.

The technology may also be applicable to digital mirror device projectors.

Light in the infrared band is used as an example of the detection light L2; however, light in the ultraviolet band may also be used as the detection light L2.

[1. 2 Configuration and Operation of Control System]

Next, a description is given of a configuration and operation of the control system in the projection display unit according to the present embodiment. Hereinafter, sections that have substantially the same configuration and effect as those described in the foregoing optical system are given identical characters, and descriptions of these sections are omitted as appropriate.

(1. 2. 1 Exemplary Configuration of Control System)

Figure 7:
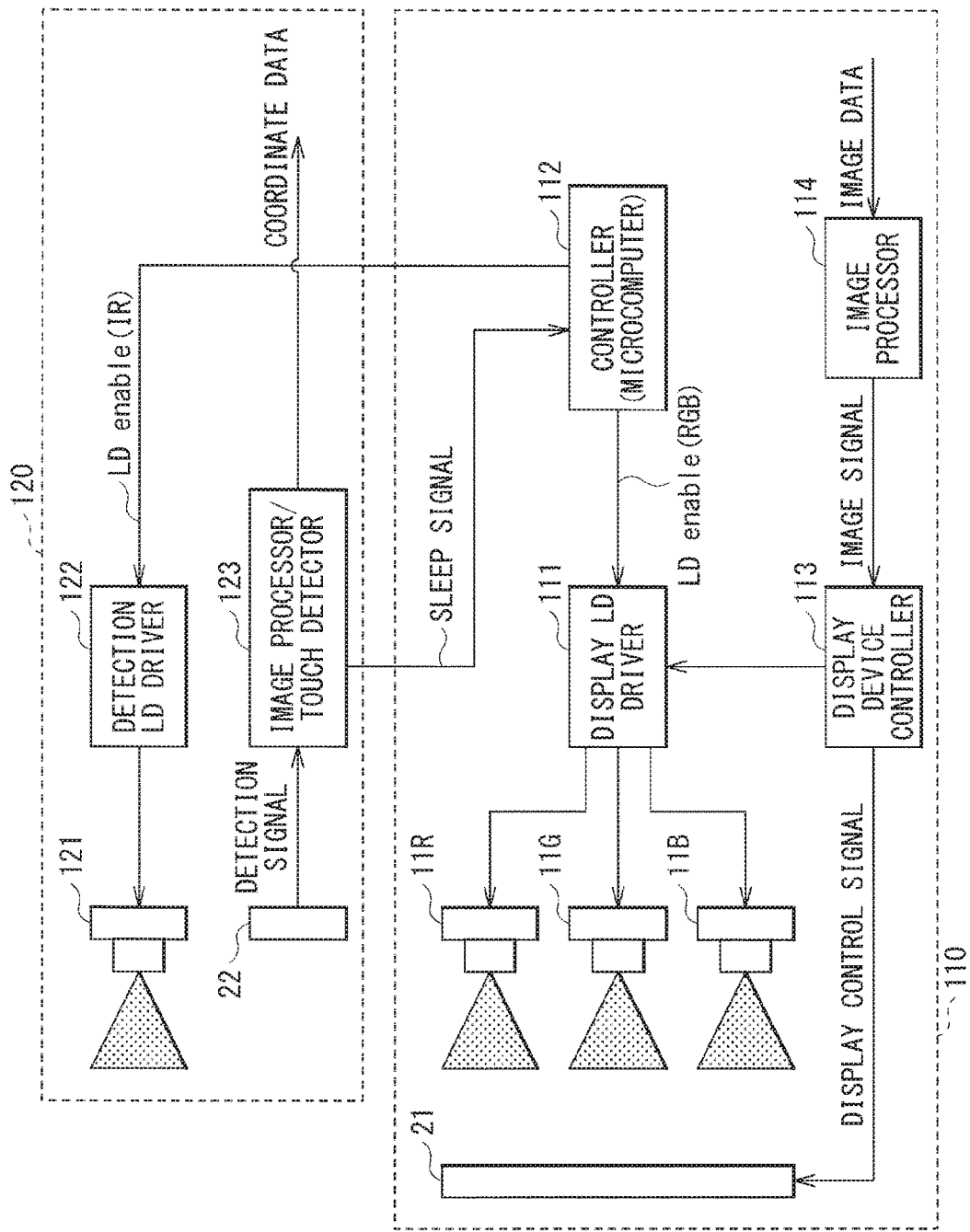
FIG. 7 is a block diagram illustrating an exemplary configuration of a control system in the projection display unit according to the first embodiment.

FIG. 7 illustrates an exemplary configuration of a control system in the projection display unit according to the present embodiment.

As described above, the projection display unit according to the present embodiment includes a projection display section 110 and a detector 120. The projection display section 110 is a section that projects an image onto the projection surface 30A with the illumination light L1. The detector 120 is a section that detects an object on or near the projection surface 30A.

The projection display section 110 includes the light bulb 21, and the blue laser 11B, the green laser 11G, and the red laser 11R, as display light sources that emit light to be used as the illumination light L1. The projection display section 110 further includes a display LD driver 111, a controller 112, a display device controller 113, and an image processor 114.

The detector 120 includes the imaging device 22 and the infrared laser 121; the infrared laser 121 is a light source that emits detection light. The detector 120 also includes the detection LD driver 122 and the image processor/touch detector 123.

The image processor 114 generates an image signal to be displayed, on the basis of received image data. The display device controller 113 generates a display control signal on the basis of the image signal supplied from the image processor 114, thereby controlling driving of the light bulb 21 that acts as a display element.

As described above, the image processor/touch detector 123 analyzes a detection signal supplied from the imaging device 22 and outputs coordinate data regarding a location of a detected object. In addition to a location of an object, the image processor/touch detector 123 may have a function of analyzing a gesture motion or other motion of the object.

The image processor/touch detector 123 outputs a power-saving instruction signal to the controller 112 in the projection display section 110 in accordance with a detection state of the object. The power-saving instruction signal corresponds to a sleep signal at the H (High) level and instructs a transition to a power-saving mode, which is also called a sleep mode. Details are described later. When an object is detected after the transition to the power-saving mode, the image processor/touch detector 123 outputs a cancel instruction signal to the controller 112 in the projection display section 110 in order to make a transition to a normal operation mode, which is also called a wakeup mode. The cancel instruction signal corresponds to the sleep signal at the L (Low) level and instructs to cancel the power-saving mode. When the detector 120 does not detect any object over a preset period, the image processor/touch detector 123 outputs the power-saving instruction signal to the controller 112 in the projection display section 110. In other words, the image processor/touch detector 123 outputs the sleep signal at the H level.

The detection LD driver 122 controls lighting of the detection light source in accordance with a lighting control signal supplied from the controller 112. This lighting control signal corresponds to an LD enable (IR) signal. The display LD driver 111 controls lighting of the display light source in accordance with a lighting control signal supplied from the controller 112. This lighting control signal corresponds to an LD enable (RGB) signal.

The controller 112 may be configured by a microcomputer, for example. The controller 112 performs ON/OFF control of the detection light source via the detection LD driver 122. In addition, the controller 112 controls the lighting of the display light source via the display LD driver 111. In other words, the controller 112 performs ON/OFF (lighting/non-lighting) control of the display light source. In this way, the controller 112 makes it possible to perform ON/OFF (lighting/non-lighting) control of both the detection light source and the display light source independently of each other.

In response to the power-saving instruction signal, which is the sleep signal at the H level, supplied from the image processor/touch detector 123, the controller 112 transits to the power-saving mode, thereby causing the display light source to be turned off. Furthermore, in response to the cancel instruction signal, which is the sleep signal at the L level, supplied from the image processor/touch detector 123, the controller 112 cancels the power-saving mode and transits to the normal operation mode, thereby causing the display light source to be turned on. The controller 112 controls the detection light source to be kept in an ON state even after having transited to the power-saving mode, thereby enabling the detector 120 to continue to perform a detection operation in substantially the same manner as in the normal operation mode.

(1. 2. 2 Operation Under Power-Saving Control)

Next, a description is given of an exemplary operation related to power-saving control. To achieve power saving, the projection display unit according to the present embodiment, when not receiving any touch input (such as detecting an object) over a preset period (e.g., about 10 minutes), transits to the power-saving mode (sleep mode), thereby turning off the display light source. Meanwhile, the projection display unit keeps the detection light source in an ON state even in the power-saving mode, thereby making it possible to continue to perform an operation of monitoring a touch input, such as detecting an object. In this way, even when the display light source is in an OFF state and thus no image is displayed on the projection surface 30A, the controller 112 turns on the display light source again in response to a touch input and displays an image on the projection surface 30A. Hereinafter, a description is given of an exemplary operation under the above power-saving control, with reference to FIG. 8 and FIG. 9.

Figure 8:
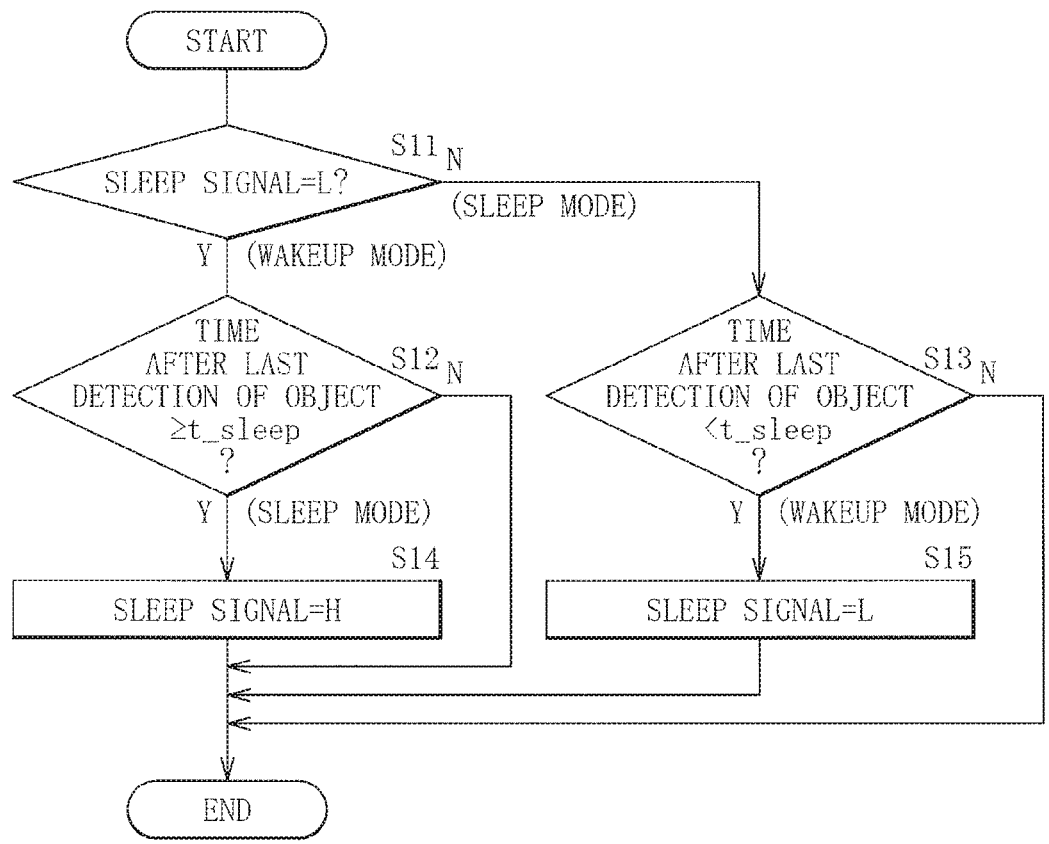
FIG. 8 is a flowchart of an exemplary operation of the detector in the first embodiment under power-saving control.

FIG. 8 illustrates an exemplary operation flow of the image processor/touch detector 123 in the detector 120 under the power-saving control. The image processor/touch detector 123 is continuously measuring a time since the detector 120 has detected an object. A threshold of a time until the transition to the power-saving mode (sleep mode) is set to a time "t_sleep". The image processor/touch detector 123 outputs the sleep signal to the controller 112. The sleep signal at the H (High) level refers to a power-saving instruction signal, which instructs a transition to the power-saving mode (sleep mode). The sleep signal at the L (Low) level corresponds to a cancel instruction signal, which instructs to cancel the power-saving mode and make a transition to the normal operation mode, or the wakeup mode. In the operation of FIG. 8, when the detector 120 does not detect any object over the preset period to which the time t_sleep or longer has been set, the controller 112 switches the sleep signal from the L level to the H level. Thereafter, when the detector 120 detects an object after the sleep signal has been set to the H level, the image processor/touch detector 123 switches the sleep signal to the L level promptly. The time t_sleep, which is a threshold until the transition to the power-saving mode, may be variable in accordance with a user's preference.

As illustrated in FIG. 8, for example, the image processor/touch detector 123 first determines whether the sleep signal is at the L level (Step S11). In this way, the image processor/touch detector 123 determines whether a current status of an operation mode is in the power-saving mode.

When the sleep signal is at the L level (Y at Step S11), the image processor/touch detector 123 determines that the current mode is not in the power-saving mode but in the normal operation mode. Thereafter, the image processor/touch detector 123 determines whether a time that has passed since the last detection of an object is the same as or longer than the preset threshold (t_sleep) (Step S12). When the time is the same as or longer than the preset threshold (Y at Step S12), the image processor/touch detector 123 switches the sleep signal from the L level to the H level in order to make a transition to the power-saving mode, and then outputs the sleep signal (Step S14). When the time does not reach the preset threshold (N at Step S12), the image processor/touch detector 123 maintains the sleep signal at the L level, thereby continuing the normal operation mode.

When the sleep signal is not at the L level (N at Step S11), the image processor/touch detector 123 determines that the current mode is the power-saving mode. Thereafter, the image processor/touch detector 123 determines whether a time that has passed since the last detection of an object is shorter than the preset threshold (t_sleep) (Step S13). When the time is shorter than the preset threshold (Y at Step S13), the image processor/touch detector 123 switches the sleep signal from the H level to the L level in order to cancel the power-saving mode and to make a transition to the normal operation mode, and then outputs the sleep signal (Step S15). When the time is the same as or longer than the preset threshold (N at Step S13), the image processor/touch detector 123 maintains the sleep signal at the H level, thereby continuing the power-saving mode.

Figure 9:
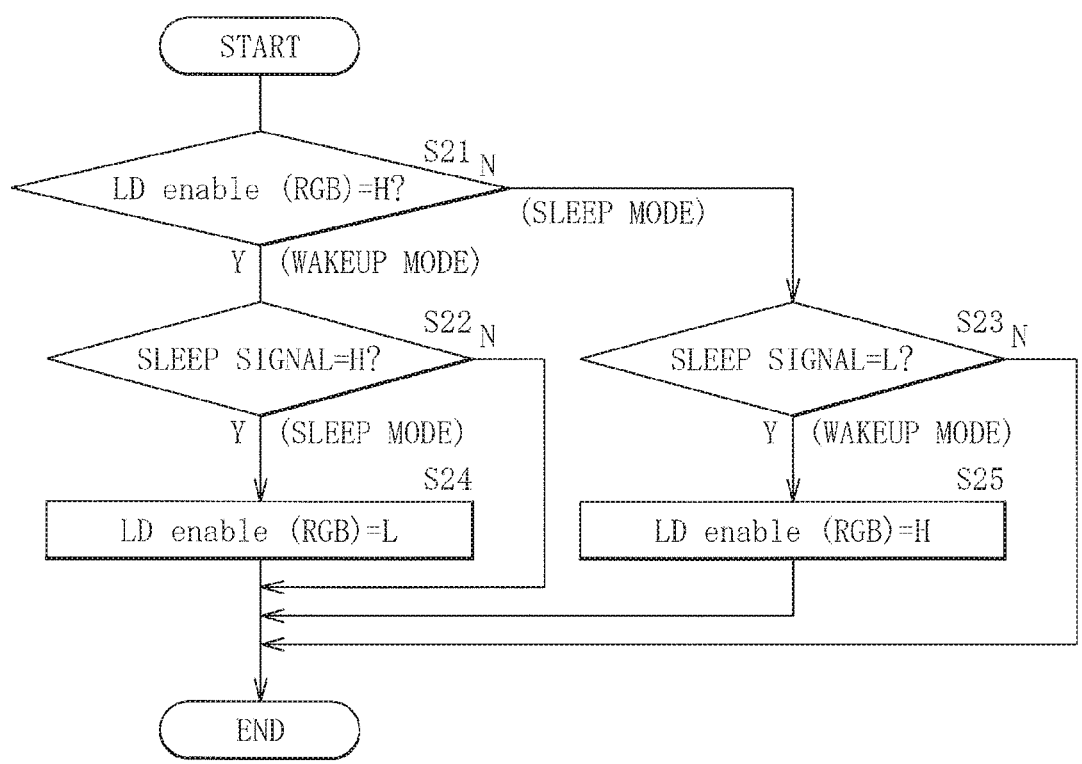
FIG. 9 is a flowchart of an exemplary operation of the projection display section in the first embodiment under the power-saving control.

FIG. 9 illustrates an exemplary operation flow of the controller 112 in the projection display section 110 under the power-saving control. The controller 112 performs ON/OFF control of the display light source on the basis of the sleep signal supplied from the image processor/touch detector 123. To perform ON/OFF control of the display light source, the controller 112 outputs the lighting control signal (LD enable (RGB) signal) to the display LD driver 111. The LD enable (RGB) signal at the H (High) level refers to turning on the display light source. The LD enable (RGB) signal at the L (Low) level refers to turning off the display light source.

As illustrated in FIG. 9, for example, the controller 112 first determines whether the LD enable (RGB) signal is at the H level (Step S21). In this way, the controller 112 determines whether the display light source is currently in an ON state.

When the LD enable (RGB) signal is at the H level (Y at Step S21), the controller 112 determines that the display light source is currently in the normal operation mode in which the display light source is turned on. Thereafter, the controller 112 determines whether the sleep signal supplied from the image processor/touch detector 123 is at the H level (Step S22). When the sleep signal is at the H level (Y at Step S22), the controller 112 switches the LD enable (RGB) signal from the H level to the L level in order to make a transition to the power-saving mode, and then outputs the LD enable (RGB) signal (Step S24). Consequently, the display light source is turned off. When the sleep signal is not at the H level (N at Step S22), the controller 112 maintains the LD enable (RGB) signal at the H level and continues the normal operation mode. Consequently, the display light source continues to be in the ON state.

When the LD enable (RGB) signal is not at the H level (N at Step S21), the controller 112 determines that the display light source is currently in the power-saving mode in which the display light source is turned off. Thereafter, the controller 112 determines whether the sleep signal supplied from the image processor/touch detector 123 is at the L level (Step S23). When the sleep signal is at the L level (Y at Step S23), the controller 112 switches the LD enable (RGB)

signal from the L level to the H level in order to make a transition to the normal operation mode, and then outputs the LD enable (RGB) signal (Step S25). Consequently, the display light source is turned on. When the sleep signal is not at the L level (N at Step S23), the controller 112 maintains the LD enable (RGB) signal at the L level and continues the power-saving mode. Consequently, the display light source continues to be in the OFF state.

[1. 3 Effect]

According to the present embodiment, as described above, the projection display section 110 turns off the display light source in response to the power-saving instruction signal, or the sleep signal at the H level, that the detector 120 outputs in accordance with a detection state of an object. This makes it possible to achieve power saving. Consequently, it is possible to perform ON/OFF control of the display light source in a projection display unit equipped with a touch detection function, through an intuitive operation of touching a surface such as a wall surface onto which an image is projected, without touching a power switch in the main body or a remote control, for example.

It is to be noted that the effects described herein are exemplary and thus not limiting. Any other effects may be present. This is applicable to other embodiments and modifications that are described below.

2. Second Embodiment

Next, a second embodiment of the disclosure is described. Hereinafter, descriptions of sections that have substantially the same configuration and effect as those in the foregoing first embodiment are omitted as appropriate.

(2.1 Configuration and Operation of Control System)

Figure 10:
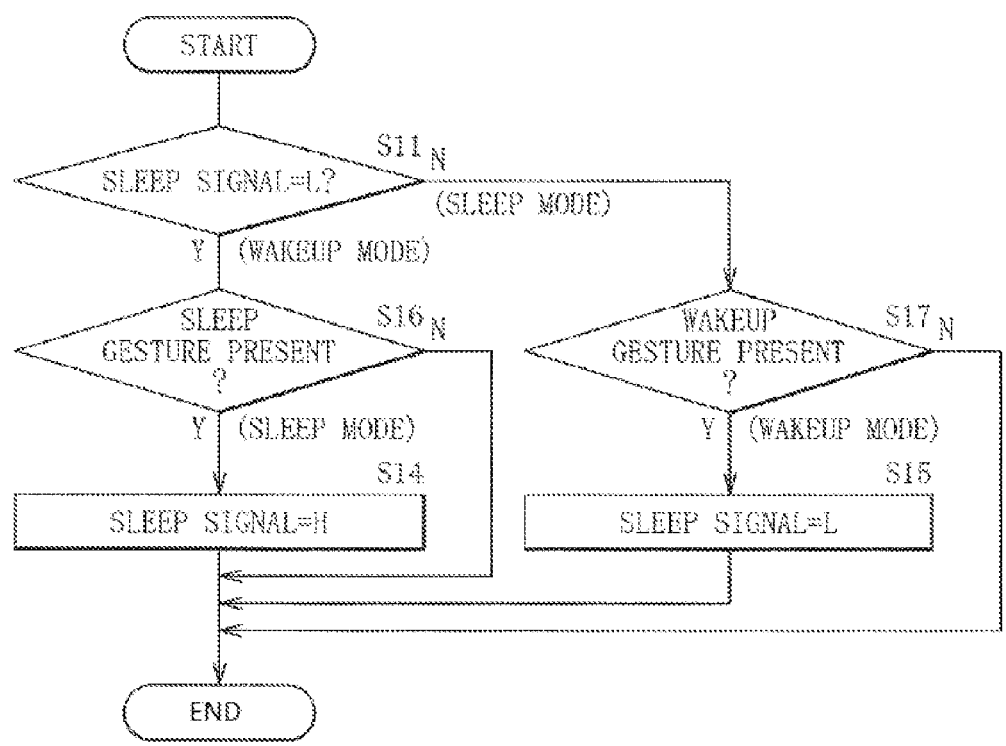
FIG. 10 is a flowchart of an exemplary operation of the projection display section in a second embodiment under the power-saving control.

FIG. 10 is an exemplary operation flow, under power-saving control, of an image processor/touch detector 123 in a detector 120 included in a projection display unit according to the present embodiment. An optical system in the projection display unit according to the present embodiment may have substantially the same overall configuration as that illustrated in FIG. 1. A control system in the projection display unit may have substantially the same configuration as that illustrated in FIG. 7. An operation flow, under the power-saving control, of a controller 112 in a projection display section 110 may be substantially the same as that illustrated in FIG. 9. In the operation flow of FIG. 10, at steps to which the identical numbers as those illustrated in FIG. 8 are assigned, substantially the same operations may be performed.

In the foregoing first embodiment, a transition is made between the power-saving mode (sleep mode) and the normal operation mode (wakeup mode), simply depending on whether an object is detected. Alternatively, the power-saving control may be performed on the basis of gesture motions. In this case, the image processor/touch detector 123 may be equipped with an advanced image processor function of, for example, analyzing a movement locus of a detected object in addition to the function of detecting coordinates of the object. Examples of gesture motions to be recognized by the image processor/touch detector 123 may include a double tap and a swipe.

For example, when the image processor/touch detector 123 detects a cancel gesture motion as a detection state of an object after the transition to the power-saving mode, the image processor/touch detector 123 may output a cancel instruction signal to the controller 112. In this case, the cancel gesture motion corresponds to an instruction to cancel the power-saving mode and is used as a wakeup gesture; the cancel instruction signal corresponds to a sleep signal at the L level. Moreover, when the image processor/touch detector 123 detects a power-saving gesture motion as a detection state of an object, the image processor/touch detector 123 may output a power-saving instruction signal to the controller 112. In this case, the power-saving gesture motion corresponds to an instruction to make a transition to the power-saving mode and is used as a sleep gesture; the power-saving instruction signal corresponds to a sleep signal at the H level.

As illustrated in FIG. 10, for example, when the sleep signal is at the L level at Step S11 (Y at Step S11), the image processor/touch detector 123 determines whether to have detected the power-saving gesture motion, or the sleep gesture (Step S16). When having detected the power-saving gesture motion (Y at Step S16), the image processor/touch detector 123 may switch the sleep signal from the L level to the H level in order to make a transition to the power-saving mode, and then may output the sleep signal (Step S14). When having not detected the power-saving gesture motion (N at Step S16), the image processor/touch detector 123 may maintain the sleep signal at the L level and may continue the normal operation mode.

When the sleep signal is not at the L level at Step S11 (N at Step S11), the image processor/touch detector 123 may determine whether to have detected the cancel gesture motion, or the wakeup gesture (Step S17). When having detected the cancel gesture motion (Y at Step S17), the image processor/touch detector 123 may switch the sleep signal from the H level to the L level in order to cancel the power-saving mode and make a transition to the normal operation mode, and then may output the sleep signal (Step S15). When having not detected the cancel gesture motion (N at Step S17), the image processor/touch detector 123 may maintain the sleep signal at the H level and may continue the power-saving mode.

Alternatively, the image processor/touch detector 123 may perform the power-saving control on the basis of whether the detector 120 detects an object at a location specified by specific coordinates. For example, when an object is detected at a position specified by specific first coordinates after the transition to the power-saving mode, the image processor/touch detector 123 may output the cancel instruction signal, which is the sleep signal at the L level, to the controller 112. When an object is detected at a position specified by specific second coordinates, the image processor/touch detector 123 may output the power-saving instruction signal, which is the sleep signal at the H level, to the controller 112.

3. Third Embodiment

Next, a third embodiment of the disclosure is described. Hereinafter, descriptions of sections that have substantially the same configuration and effect as those described in the foregoing first or second embodiment are omitted as appropriate.

(3. 1. Configuration and Operation of Control System)

Figure 11:
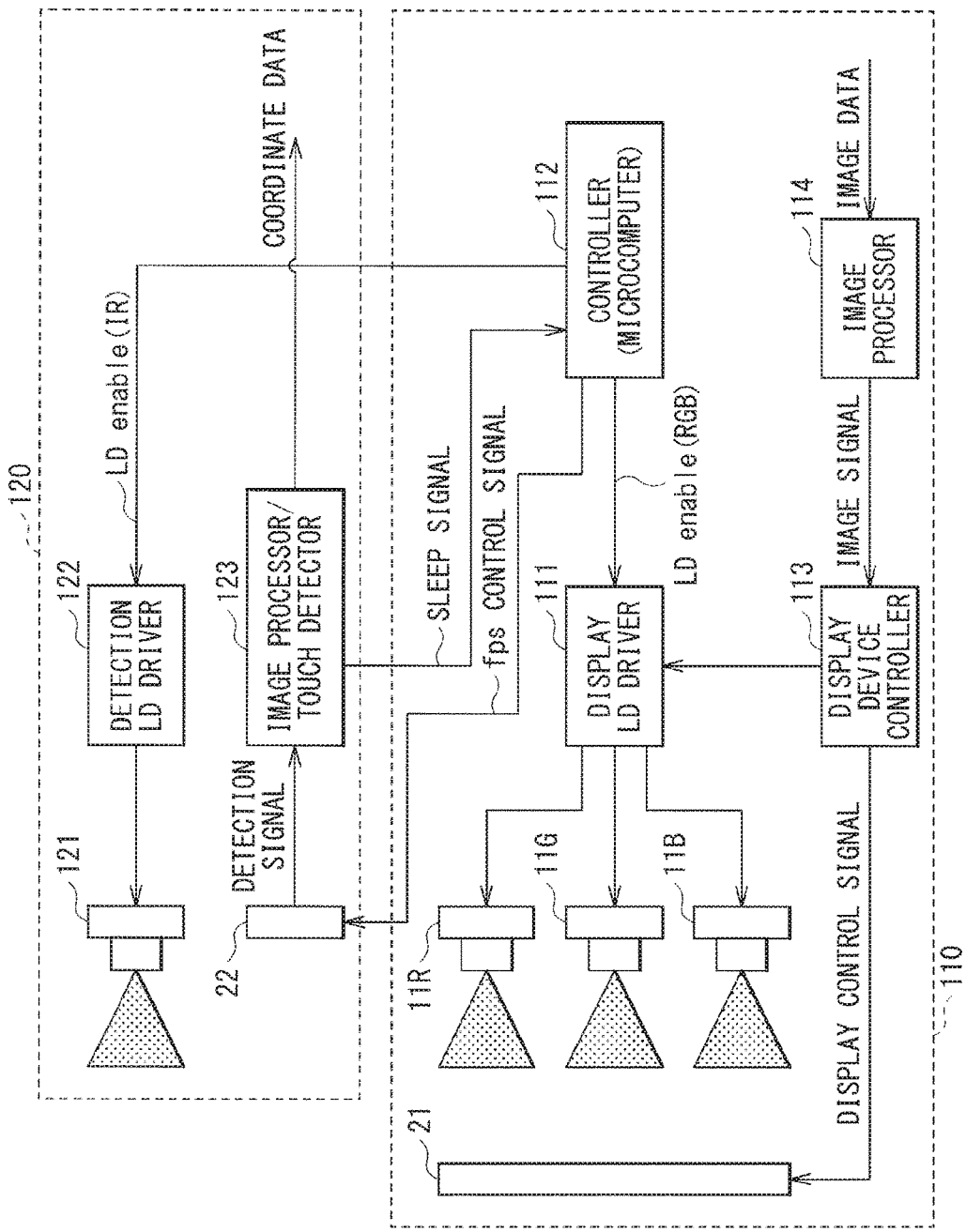
FIG. 11 is a block diagram illustrating an exemplary configuration of a control system in a projection display unit according to a third embodiment.
Figure 12:
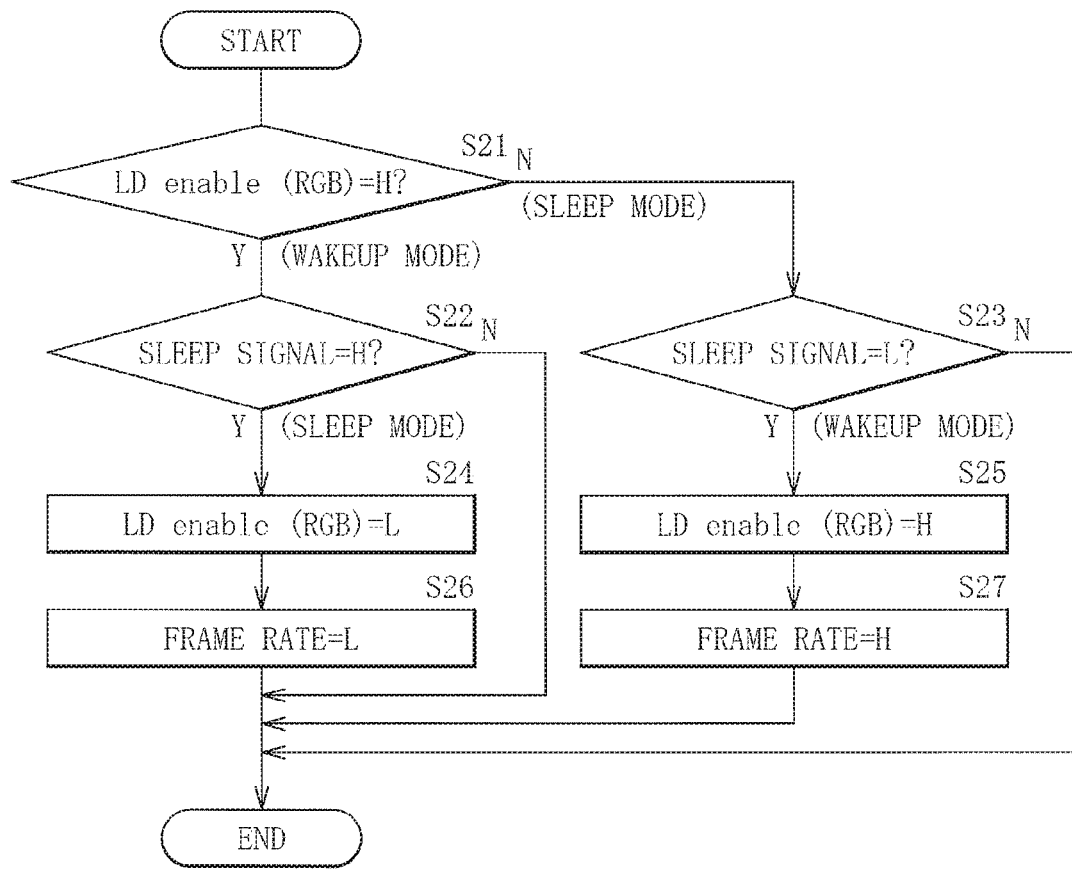
FIG. 12 is a flowchart of an exemplary operation of a projection display section in the third embodiment under power-saving control.

FIG. 11 illustrates an exemplary configuration of a control system in a projection display unit according to the present embodiment. FIG. 12 illustrates an exemplary operation flow, under power-saving control, of a controller 112 included in the projection display section 110 according to the present embodiment. An optical system in the projection display unit according to the present embodiment may have substantially the same configuration as that illustrated in FIG. 1. An operation flow, under the power-saving control, of an image processor/touch detector 123 in a detector 120 may be substantially the same as that illustrated in FIG. 8 or FIG. 10. In the operation flow of FIG. 12, at steps to which the identical numbers as those illustrated in FIG. 9 are assigned, substantially the same operations may be performed.

In the examples illustrated in foregoing first and second embodiments, only the display light source is subjected to the power-saving control. However, other sections may also be subjected to the power-saving control. As one alternative example, an imaging device 22 and an infrared laser 121 serving as a detection light source in the detector 120 may also be subjected to the power-saving control. For example, the controller 112 may control a frame rate of the imaging device 22 in such a way that the frame rate in the power-saving mode is lower than that in the normal operation mode. In this case, as one example, the frame rate in the normal operation mode may be set to 60 fps (frame per second), whereas the frame rate in the power-saving mode may be set to 15 fps. Furthermore, when being in the power-saving mode, the controller 112 may cause the detection light source to be turned on in an intermittent manner so as to be synchronized with the frame rate of the imaging device 22.

As illustrated in FIG. 12, for example, at Step S24, the controller 112 may switch an LD enable (RGB) signal from the H level to the L level in order to make a transition to the power-saving mode, and then may output the LD enable (RGB) signal. Further, the controller 112 may switch a fps control signal, which is also referred to as a frame rate signal, to the L level, and may output the fps control signal (Step S26). The fps control signal is used to control the frame rate. In this way, the frame rate of the imaging device 22 in the power-saving mode is lowered.

At Step S25, the controller 112 may switch the LD enable (RGB) signal from the L level to the H level in order to make a transition to the normal operation mode, and then may output this LD enable (RGB) signal. Further, the controller 112 may switch the frame rate signal to the H level, and may output the frame rate signal (Step S27). In this way, the frame rate of the imaging device 22 is switched from the normal operation mode to a normal state.

4. Fourth Embodiment

Next, a fourth embodiment of the disclosure is described. Hereinafter, descriptions of sections that have substantially the same configuration and effect as those described in the foregoing first to third embodiments are omitted as appropriate.

(4. 1 Configuration and Operation of Control System)

Figure 13:
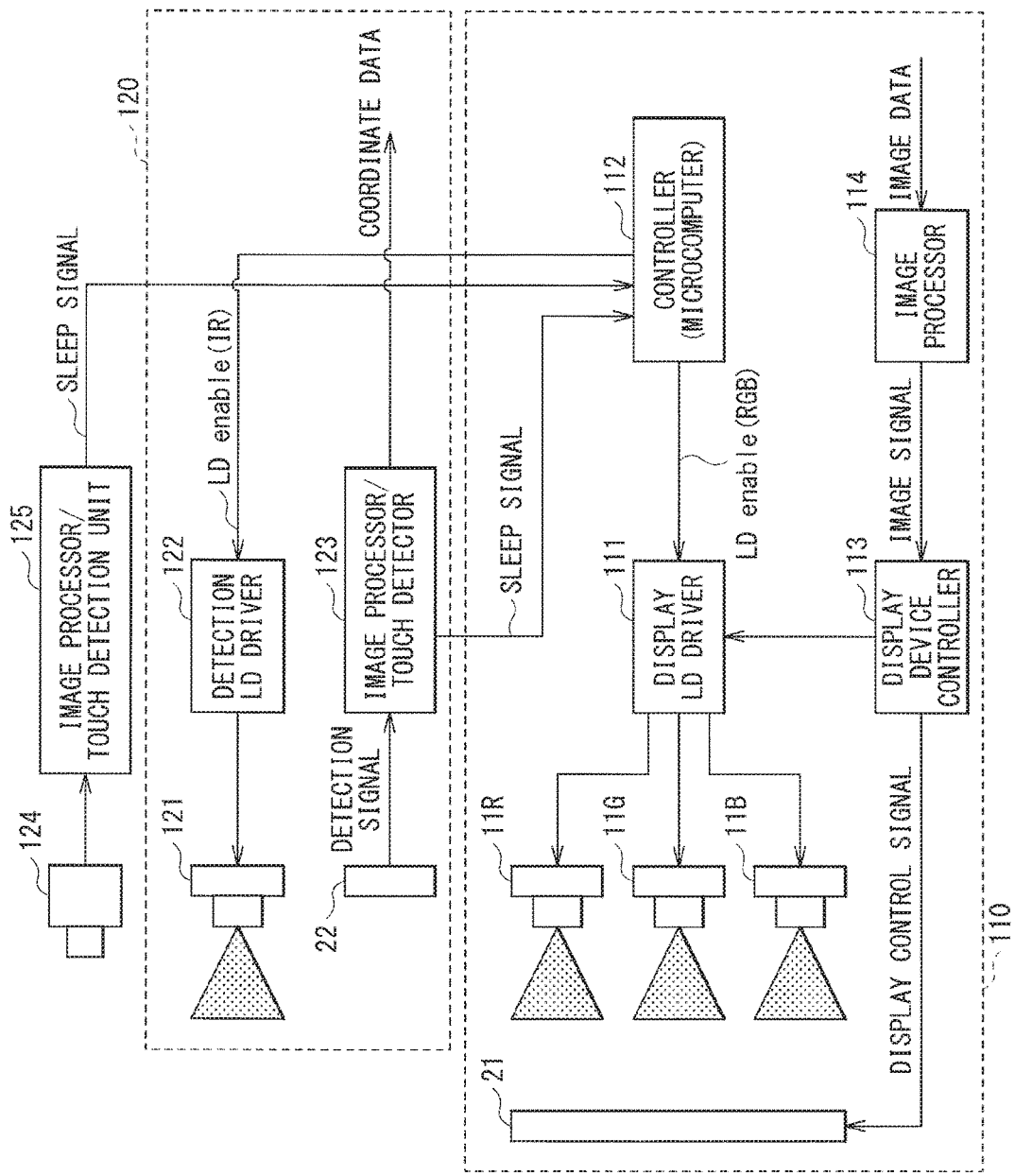
FIG. 13 is a block diagram illustrating an exemplary configuration of a control system in a projection display unit according to a fourth embodiment.

FIG. 13 illustrates an exemplary configuration of a control system in a projection display unit according to the present embodiment. An optical system in the projection display unit according to the present embodiment may have substantially the same overall configuration as that illustrated in FIG. 1. An operation flow, under power-saving control, of an image processor/touch detector 123 in a detector 120 may be substantially the same as that illustrated in FIG. 8 or FIG. 10. An operation flow, under power-saving control, of a controller 112 in a projection display section 110 may be substantially the same as that illustrated in FIG. 9 or FIG. 12.

In the foregoing first to third embodiments, the detector 120 detects an object and outputs a sleep signal. As illustrated in FIG. 13, however, a camera 124 and an image processor/touch detector 125 may be further added independently of the detector 120 and detect an object and output a sleep signal.

For example, the camera 124 may be provided so as to image a region surrounding a surface onto which an image is projected. The image processor/touch detector 125 may detect an object in a detection level necessary merely for power-saving control. An operation of the image processor/touch detector 125 under the power-saving control may be substantially the same as that illustrated in FIG. 8 or FIG. 10.

It is also possible to choose which of detection results from the detector 120 and the camera 124 is to be used to perform the power-saving control, in accordance with a user's preference.

5. Other Embodiments

The technology of the disclosure is not limited to the foregoing embodiments and modifications and thus may be modified in various ways.

For example, the technology may have the following configuration.

(1) A projection display unit with a detection function, including:
  a projection display section including a display light source that emits light used as illumination light, the projection display section projecting an image onto a projection surface with the illumination light; and
  a detector including a detection light source that emits detection light, the detector detecting an object on or near the projection surface, and outputting a power-saving instruction signal to the projection display section in accordance with a detection state of the object, the power-saving instruction signal instructing a transition to a power-saving mode,
  the projection display section turning off the display light source in response to the power-saving instruction signal.
(2) The projection display unit with a detection function according to (1), wherein the detector keeps turning on the detection light source and continues to detect the object even after the transition to the power-saving mode.
(3) The projection display unit with a detection function according to (2), wherein
  the detector outputs a cancel instruction signal to the projection display section in accordance with the detection state of the object when detecting the object after the transition to the power-saving mode, the cancel instruction signal instructing to cancel the power-saving mode, and
  the projection display section turns on the display light source in response to the cancel instruction signal.
(4) The projection display unit with a detection function according to (3), wherein the detector outputs the cancel instruction signal to the projection display section when detecting a cancel gesture motion as the detection state of the object after the transition to the power-saving mode, the cancel gesture motion instructing to cancel the power-saving mode.
(5) The projection display unit with a detection function according to one of (1) to (4), wherein the detector outputs the power-saving instruction signal to the projection display section when failing to detect the object at least over a preset period.
(6) The projection display unit with a detection function according to one of (1) to (5), wherein the detector outputs the power-saving instruction signal to the projection display section when detecting at least a power-saving gesture motion as the detection state of the object, the power-saving gesture motion instructing a transition to the power-saving mode.

(7) The projection display unit with a detection function according to one of (1) to (6), wherein
the detector further includes an imaging device that detects the object, and
the detector sets a frame rate of the imaging device in the power-saving mode to be lower than the frame rate of the imaging device in a mode other than the power-saving mode.

(8) The projection display unit with a detection function according to one of (1) to (7), wherein
the projection display section further includes
a light bulb, and
a projection lens,
the light bulb modulating the illumination light on a basis of image data and outputting the modulated light,
the projection lens projecting the modulated light from the light bulb onto the projection surface, the projection lens receiving the detection light for the object from a direction opposite to a travel direction of the modulated light,
the detector further includes an imaging device disposed at a mutually optically conjugate location to the light bulb, and
the detection light hits the object and is scattered by the object, and the scattered light passes through the projection lens and enters the imaging device as the detection light for the object.

(9) The projection display unit with a detection function according to one of (1) to (8), wherein the detection light is emitted at a predetermined height above the projection surface, and the detection light covers at least a region corresponding to a projection region of the image.

(10) The projection display unit with a detection function according to one of (1) to (9), wherein the detection light includes infrared light.

This application is based upon and claims the benefit of priority of the Japanese Patent Application No. 2014-178963 filed with the Japan Patent Office on Sep. 3, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A projection display unit, comprising:
a projection display section, wherein
the projection display section includes a display light source configured to emit light used as illumination light, and
the projection display section is configured to project an image onto a projection surface with the illumination light; and
a detector, that includes:
a detection light source configured to emit detection light in a direction parallel to a projection plane of the projection surface; and
an imaging device configured to detect a location of an object on the projection surface, wherein the detector is configured to:
output a sleep signal at a first level to the projection display section based on the detected location that corresponds to first coordinates in the projection plane of the projection surface,
wherein the sleep signal at the first level instructs the projection display unit to transition to a power-saving mode;
output the sleep signal at a second level based on the detected location that corresponds to second coordinates in the projection plane of the projection surface, subsequent to the transition to the power-saving mode, wherein
the sleep signal at the second level instructs the projection display unit to cancel the power-saving mode, and
the projection display section is further configured to turn off the display light source in the power-saving mode;
turn-on the detection light source to monitor an input corresponding to the object in the power-saving mode; and
set a first frame rate of the imaging device in the power-saving mode, wherein the first frame rate is lower than a second frame rate of the imaging device in a mode other than the power-saving mode.

2. The projection display unit according to claim 1, wherein the detector is further configured to receive the input corresponding to presence of the object in the power-saving mode.

3. The projection display unit according to claim 2, wherein
the detector is further configured to switch the sleep signal from the first level to the second level to transition the projection display section from the power-saving mode to a wakeup mode based on:
the location of the object, and
detection of the object after the transition to the power-saving mode,
and
the projection display section is further configured to turn on the display light source in the wakeup mode.

4. The projection display unit according to claim 3, wherein
the detector is further configured to switch the sleep signal from the first level to the second level based on a detection of a cancel gesture motion of the object after the transition to the power-saving mode, and
the cancel gesture motion instructs the projection display section to cancel the power-saving mode.

5. The projection display unit according to claim 1, wherein the detector is further configured to output the sleep signal at the first level to the projection display section based on a failure to detect the object for a preset period.

6. The projection display unit according to claim 1, wherein
the detector is further configured to output the sleep signal at the first level to the projection display section based on a detection of a power-saving gesture motion of the object, and
the power-saving gesture motion instructs the transition of the projection display unit to the power-saving mode.

7. The projection display unit according to claim 1, wherein
the projection display section further includes:
a light bulb, wherein the light bulb is configured to:
modulate the illumination light based on the image, and
output the modulated illumination light; and
a projection lens, wherein the projection lens is configured to:

project the modulated illumination light from the light bulb onto the projection surface, and receive the detection light from the object in a direction opposite to a travel direction of the modulated illumination light, and the detector further includes the imaging device at a mutually optically conjugate location to the light bulb.

8. The projection display unit according to claim 1, wherein the detector is further configured to emit the detection light at a specific height above the projection surface, and the detection light covers at least a region corresponding to a projection region of the image.

9. The projection display unit according to claim 1, wherein the detection light comprises infrared light.

* * * * *